US005996531A

United States Patent [19]

Anderson

[11] Patent Number: 5,996,531

[45] Date of Patent: Dec. 7, 1999

[54] PROTECTIVE PET DISH

[76] Inventor: Frank D. Anderson, 4502 Smoky Wood La., San Antonio, Tex. 78249

[21] Appl. No.: 09/095,983

[22] Filed: Jun. 11, 1998

[51] Int. Cl.[6] .............................. A01K 5/01

[52] U.S. Cl. .............................. 119/61; 43/109

[58] Field of Search .............................. 119/61, 51.5, 72, 119/74; 43/124, 132.1, 107, 109

[56] References Cited

U.S. PATENT DOCUMENTS

| | | | |
|---|---|---|---|
| 223,321 | 1/1880 | Denton | 43/109 |
| 820,075 | 5/1906 | Thayer | 119/61 |
| 846,067 | 3/1907 | Thayer | 119/61 |
| 898,852 | 9/1908 | Duggan | 43/109 |
| 1,855,314 | 4/1932 | Schacht | 119/51.5 |
| 2,584,301 | 2/1952 | Sinclair | 119/61 |
| 2,936,926 | 5/1960 | Miller | 220/571 |
| 4,044,723 | 8/1977 | Fitzpatrick | 119/61 |
| 4,658,759 | 4/1987 | Brown | 119/61 |
| 5,467,738 | 11/1995 | Class | 119/61 |

FOREIGN PATENT DOCUMENTS

| | | | |
|---|---|---|---|
| 2188525 | 10/1987 | United Kingdom | 119/61 |

*Primary Examiner*—Michael J. Carone
*Assistant Examiner*—James S. Bergin

[57] ABSTRACT

A protective pet dish for preventing crawling insects from climbing into the pet dish. The device includes a container resting on a resting frame. The resting frame has a plurality of support legs downwardly depending therefrom. Each of the support legs has a moat cup. Each moat cup has a base and spaced apart inner and outer ring walls. The base of the moat cup has a center and an outer perimeter. The outer ring wall of the moat cup is upwardly extended around the outer perimeter of the base of the moat cup. The inner ring wall of the moat cup is upwardly extended from the base of the respective moat cup between the center of the base and the outer perimeter of the base. The inner ring wall defines a center space. The inner and outer ring walls define a moat space therebetween for holding a fluid therein. The lower end of each support leg is inserted into the center space of the associated moat cup such that the lower end of the support leg rests on the base of the moat cup.

9 Claims, 3 Drawing Sheets

PROTECTIVE PET DISH

BACKGROUND OF THE INVENTION

1. Field of the Invention

The present invention relates to pet dishes and more particularly pertains to a new protective pet dish for preventing crawling insects from climbing into the pet dish.

2. Description of the Prior Art

The use of pet dishes is known in the prior art. More specifically, pet dishes heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet dishes include U.S. Pat. No. 5,277,149; U.S. Pat. No. 4,007,711; U.S. Pat. No. 5,253,609; U.S. Pat. No. 4,896,627; U.S. Pat. No. 5,148,626; and U.S. Pat. No. Des. 342,353.

While these devices fulfill their respective, particular objectives and requirements, the aforementioned patents do not disclose a new protective pet dish. The inventive device includes a container resting on a resting frame. The resting frame has a plurality of support legs downwardly depending therefrom. Each of the support legs has a moat cup. Each moat cup has a base and spaced apart inner and outer ring walls. The base of the moat cup has a center and an outer perimeter. The outer ring wall of the moat cup is upwardly extended around the outer perimeter of the base of the moat cup. The inner ring wall of the moat cup is upwardly extended from the base of the respective moat cup between the center of the base and the outer perimeter of the base. The inner ring wall defines a center space. The inner and outer ring walls define a moat space therebetween for holding a fluid therein. The lower end of each support leg is inserted into the center space of the associated moat cup such that the lower end of the support leg rests on the base of the moat cup.

In these respects, the protective pet dish according to the present invention substantially departs from the conventional concepts and designs of the prior art, and in so doing provides an apparatus primarily developed for the purpose of preventing crawling insects from climbing into the pet dish.

SUMMARY OF THE INVENTION

In view of the foregoing disadvantages inherent in the known types of pet dishes now present in the prior art, the present invention provides a new protective pet dish construction wherein the same can be utilized for preventing crawling insects from climbing into the pet dish.

The general purpose of the present invention, which will be described subsequently in greater detail, is to provide a new protective pet dish apparatus and method which has many of the advantages of the pet dishes mentioned heretofore and many novel features that result in a new protective pet dish which is not anticipated, rendered obvious, suggested, or even implied by any of the prior art pet dishes, either alone or in any combination thereof.

To attain this, the present invention generally comprises a container resting on a resting frame. The resting frame has a plurality of support legs downwardly depending therefrom. Each of the support legs has a moat cup. Each moat cup has a base and spaced apart inner and outer ring walls. The base of the moat cup has a center and an outer perimeter.

The outer ring wall of the moat cup is upwardly extended around the outer perimeter of the base of the moat cup. The inner ring wall of the moat cup is upwardly extended from the base of the respective moat cup between the center of the base and the outer perimeter of the base. The inner ring wall defines a center space. The inner and outer ring walls define a moat space therebetween for holding a fluid therein. The lower end of each support leg is inserted into the center space of the associated moat cup such that the lower end of the support leg rests on the base of the moat cup.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective pet dish apparatus and method which has many of the advantages of the pet dishes mentioned heretofore and many novel features that result in a new protective pet dish which is not anticipated, rendered obvious, suggested, or even implied by any of the prior art pet dishes, either alone or in any combination thereof.

It is another object of the present invention to provide a new protective pet dish which may be easily and efficiently manufactured and marketed.

It is a further object of the present invention to provide a new protective pet dish which is of a durable and reliable construction.

An even further object of the present invention is to provide a new protective pet dish which is susceptible of a low cost of manufacture with regard to both materials and labor, and which accordingly is then susceptible of low prices of sale to the consuming public, thereby making such protective pet dish economically available to the buying public.

Still yet another object of the present invention is to provide a new protective pet dish which provides in the apparatuses and methods of the prior art some of the advantages thereof, while simultaneously overcoming some of the disadvantages normally associated therewith.

Still another object of the present invention is to provide a new protective pet dish for preventing crawling insects from climbing into the pet dish.

Yet another object of the present invention is to provide a new protective pet dish which includes a container resting on a resting frame. The resting frame has a plurality of support legs downwardly depending therefrom. Each of the support legs has a moat cup. Each moat cup has a base and spaced apart inner and outer ring walls. The base of the moat cup has a center and an outer perimeter. The outer ring wall of the moat cup is upwardly extended around the outer perimeter of the base of the moat cup. The inner ring wall of the moat cup is upwardly extended from the base of the respective moat cup between the center of the base and the outer perimeter of the base. The inner ring wall defines a center space. The inner and outer ring walls define a moat space therebetween for holding a fluid therein. The lower end of each support leg is inserted into the center space of the associated moat cup such that the lower end of the support leg rests on the base of the moat cup.

Still yet another object of the present invention is to provide a new protective pet dish that prevents ants, especially fire ants, and spiders from crawling into the pet dish to contaminate the food or water in the pet dish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
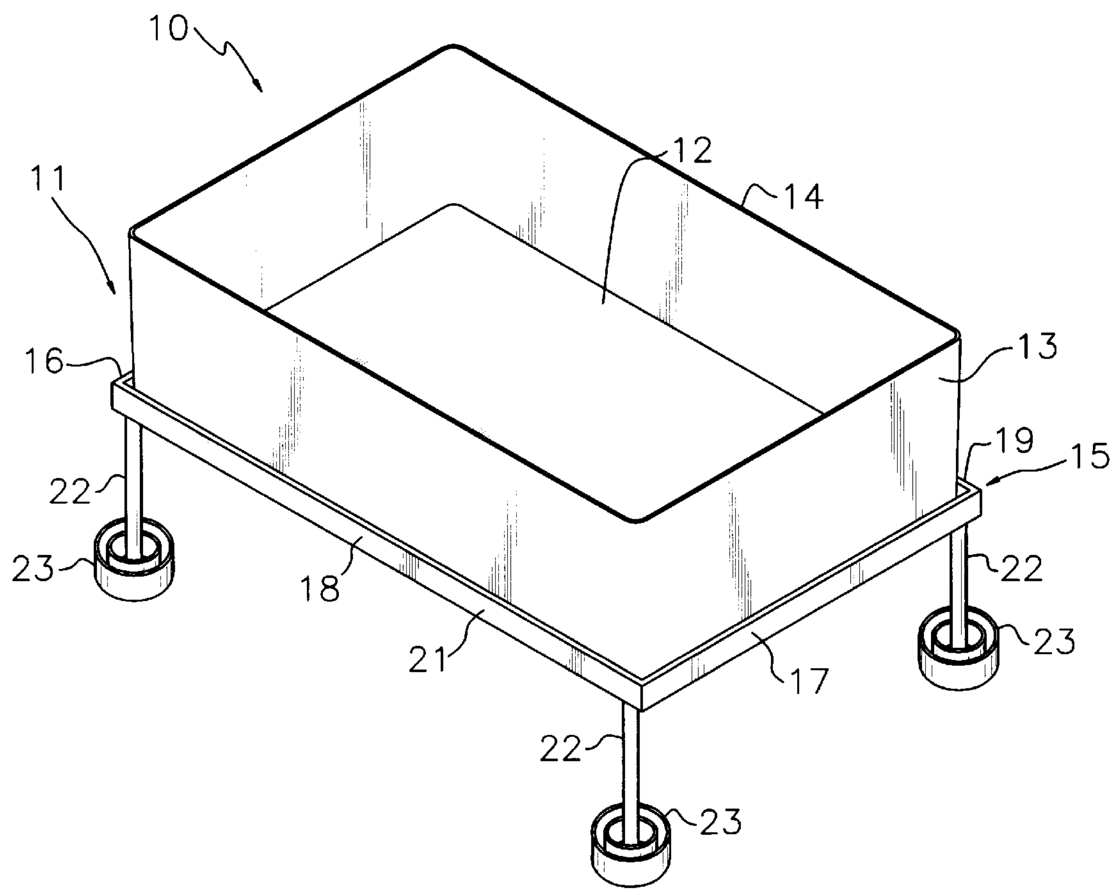
FIG. 1 is a schematic perspective view of a new protective pet dish according to the present invention.
Figure 2:
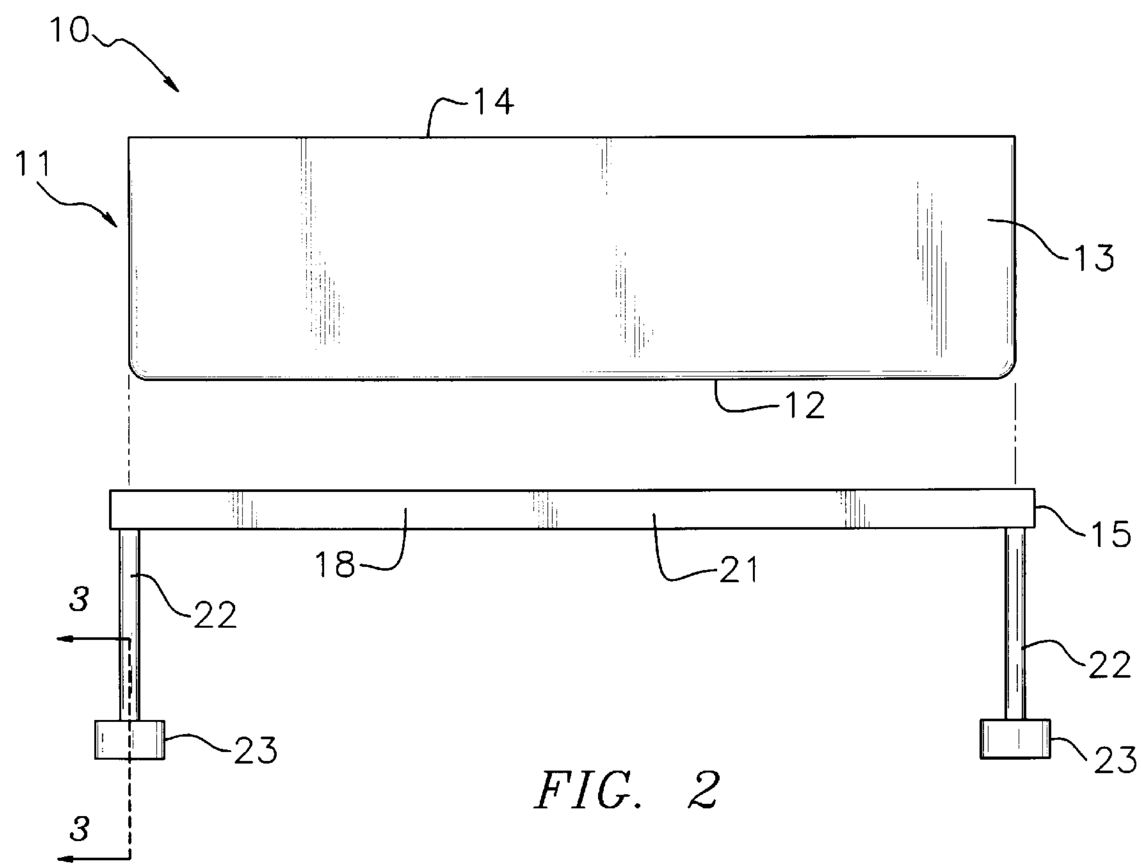
FIG. 2 is a schematic exploded side view of the present invention.
Figure 3:
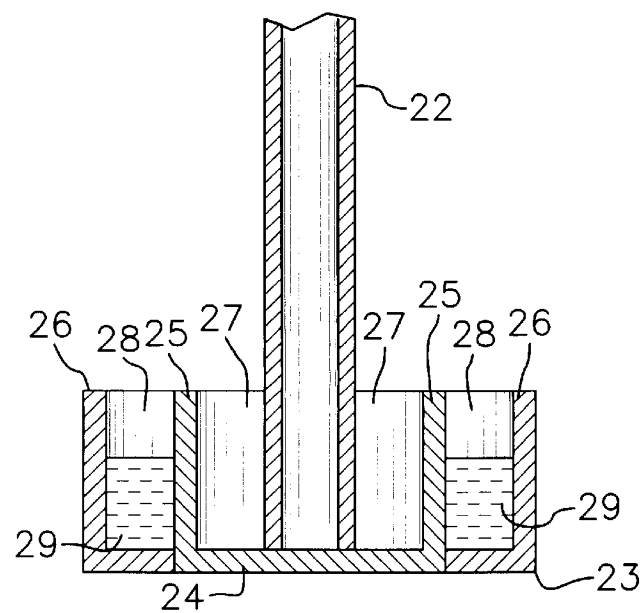
FIG. 3 is a schematic sectional view of the present invention taken from line 3—3 of FIG. 2.
Figure 4:
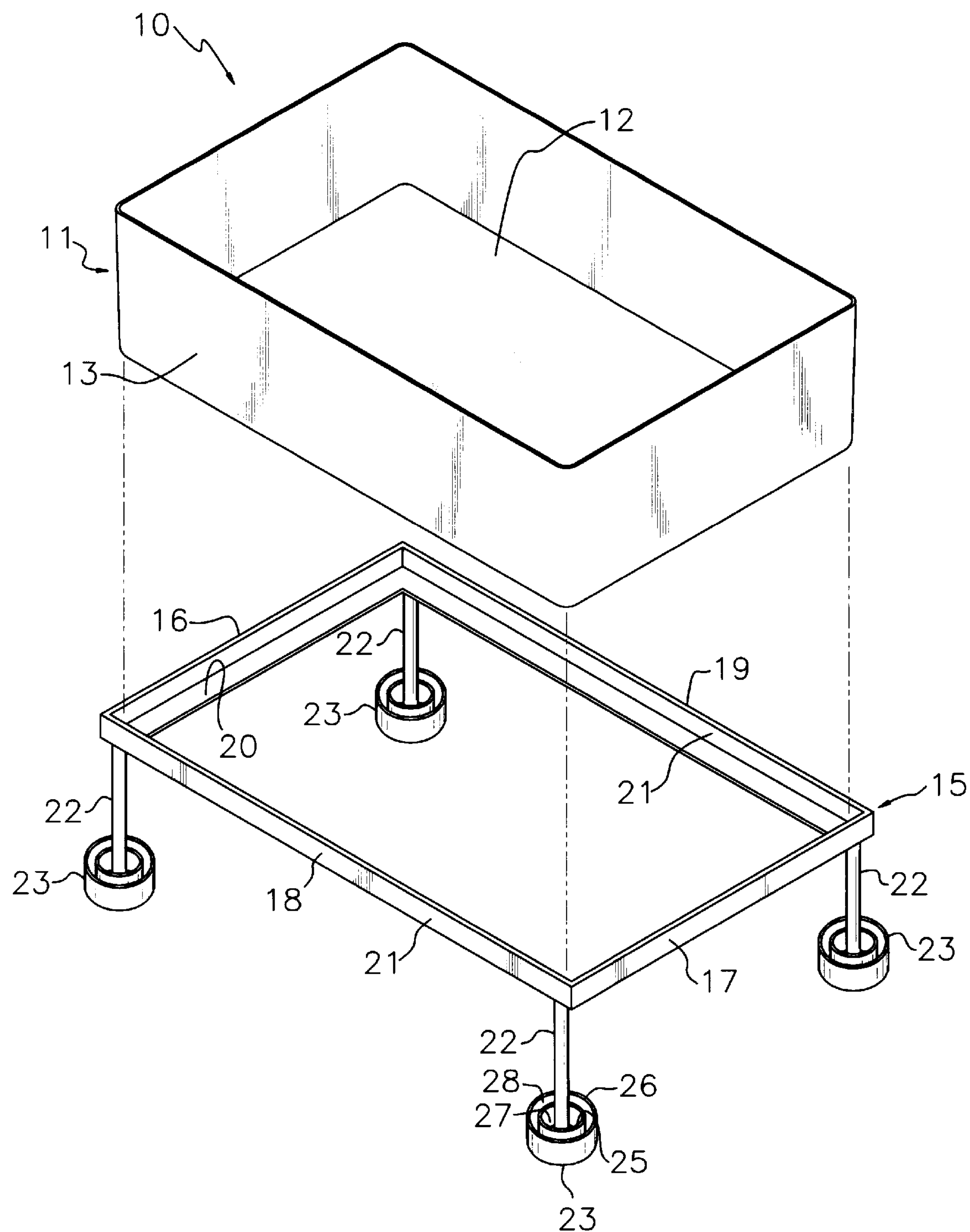
FIG. 4 is a schematic perspective exploded view of the present invention.

With reference now to the drawings, and in particular to FIGS. 1 through 4 thereof, a new protective pet dish embodying the principles and concepts of the present invention and generally designated by the reference numeral 10 will be described.

As best illustrated in FIGS. 1 through 4, the protective pet dish 10 generally comprises a container 11 resting on a resting frame 15. The resting frame 15 has a plurality of support legs 22 downwardly depending therefrom. Each of the support legs 22 has a moat cup 23. Each moat cup 23 has a base 24 and spaced apart inner and outer ring walls 25,26. The base 24 of the moat cup 23 has a center and an outer perimeter. The outer ring wall 26 of the moat cup 23 is upwardly extended around the outer perimeter of the base 24 of the moat cup 23. The inner ring wall 25 of the moat cup 23 is upwardly extended from the base 24 of the respective moat cup 23 between the center of the base 24 and the outer perimeter of the base 24. The inner ring wall 25 defines a center space 27. The inner and outer ring walls 25,26 define a moat space 28 therebetween for holding a fluid 29 therein. The lower end of each support leg is inserted into the center space 27 of the associated moat cup 23 such that the lower end of the support leg rests on the base 24 of the moat cup 23.

In closer detail, the container 11 has a bottom panel 12 and a side wall 13 defining a space for holding food and liquid therein. The bottom panel 12 of the container 11 is generally rectangular and has an generally rectangular outer perimeter. The side wall 13 of the container 11 is upwardly extended around the outer perimeter of the bottom panel 12 of the container 11. The side wall 13 of the container 11 has an upper edge 14. The container 11 has a height defined between the bottom panel 12 of the container 11 and the upper edge 14 of the side wall 13 of the container 11. Preferably, the height of the container 11 is at least 4 inches. Ideally, the height of the container 11 is about 6 inches.

The resting frame 15 is generally rectangular and has a pair of spaced apart end rails 16,17 and a pair of spaced apart side rails 18,19 extending between the end rails 16,17 of the resting frame 15 such that a rectangular central space is formed by the rails of the resting frame 15. The resting frame 15 has four of corners with a corner formed at each intersection between a end rail and a side rail of the resting frame 15. The lengths of the end rails 16,17 of the resting frame 15 are generally parallel to each other. The lengths of the side rails 18,19 of the resting frame 15 are generally parallel to each other. The lengths of the end rails 16,17 are generally perpendicular to the lengths of the side rails 18,19. Each of the rails of the resting frame 15 has a generally L-shaped cross section taken generally perpendicular to the length of the rail so that each of the rails has a generally horizontal portion 20 and a generally vertical portion 21 upwardly extending from the horizontal portion 20 of the rail. The bottom panel 12 of the container 11 is rested on the horizontal portions 20 of the rails of the resting frame 15 with the vertical portions 21 of the rails of the resting frame 15 disposed around the side wall 13 of the container 11.

The resting frame 15 has a plurality of support legs 22 downwardly depending therefrom with a support leg positioned adjacent each of the corners of the resting frame 15. The support legs 22 are designed for supporting the resting frame 15 above a ground surface. Each of the support legs 22 has upper and lower ends. The upper ends of the support legs 22 are coupled to the horizontal portion 20 of the resting frame 15.

Each of the support legs 22 has a moat cup 23. Each moat cup 23 has a base 24 and spaced apart inner and outer ring walls 25,26. The base 24 of the moat cup 23 is generally circular and has a center and a circumferential outer perimeter. The outer ring wall 26 of the moat cup 23 is generally cylindrical and is upwardly extended around the outer perimeter of the base 24 of the moat cup 23. The inner ring wall 25 of the moat cup 23 is generally cylindrical and is upwardly extended from the base 24 of the respective moat cup 23 between the center of the base 24 and the outer perimeter of the base 24. The inner ring wall 25 defining a center space 27. The inner and outer ring walls 25,26 define a moat space 28 therebetween for holding a fluid 29 therein for preventing crawling insects from reaching the support legs 22. The lower end of each support leg is inserted into the center space 27 of the associated moat cup 23 such that the lower end of the support leg rests on the base 24 of the moat cup 23. Preferably, the longitudinal axis of the support leg is centered on the center of the base 24 of the moat cup 23. The lower end of the support leg is preferably coupled to the base 24 of the moat cup 23. Preferably, the inner ring wall 25 has a diameter of about half the diameter of the outer ring wall 26. Ideally, the diameter of the outer ring wall 26 is about 3½ inches and the diameter of the inner ring wall 25 is about 1¼ inches. Also preferably, the diameter of the support leg is less than the diameter of the inner ring wall 25 such that the support leg is spaced apart from the inner ring wall 25.

In use, the container is filled with food or water and rested on the resting frame. The moat spaces of the moat cups are filled with fluid such as water to prevent crawling insects on the ground from climbing up the support legs into the container to contaminate the food therein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective pet dish apparatus, comprising:

a container;

a resting frame wherein said resting frame has a pair of spaced apart end rails and a pair of spaced apart side rails extending between said end rails of said resting frame, said resting frame having a plurality of corners, a corner of said resting frame being formed at each intersection between an end rail and a side rail of said resting frame, each of said rails of said resting frame has a generally L-shaped cross section, each of said rails having a generally horizontal portion and a generally vertical portion upwardly extending from said horizontal portion of said rail, said container being rested on said horizontal portions of said rails of said resting frame;

said resting frame having a plurality of support legs downwardly depending therefrom;

each of said support legs having upper and lower ends, said upper ends of said support legs being coupled to said resting frame;

each of said support legs having a moat cup, each moat cup having a base and spaced apart inner and outer ring walls;

said base of said moat cup having a center and an outer perimeter;

said outer ring wall of said moat cup being upwardly extended around said outer perimeter of said base of said moat cup;

said inner ring wall of said moat cup being upwardly extended from said base of the respective moat cup between said center of said base and said outer perimeter of said base;

said inner ring wall defining a center space, said inner and outer ring walls defining a moat space, said moat space being for holding a fluid therein; and said lower end of each support leg being inserted into said center space of the associated moat cup such that said lower end of said support leg rests on said base of said moat cup.

2. The protective pet dish of claim 1, wherein said container has a bottom panel and a side wall, said bottom panel of said container having an outer perimeter, said side wall of said container being upwardly extended around said outer perimeter of said bottom panel of said container.

3. The protective pet dish of claim 2, wherein said side wall of said container having an upper edge, said container having a height defined between said bottom panel of said container and said upper edge of said side wall of said container.

4. The protective pet dish of claim 3, wherein said height of said container is at least 4 inches.

5. The protective pet dish of claim 3, wherein said height of said container is about 6 inches.

6. The protective pet dish of claim 1, wherein each of said rails of said resting frame having a length, said lengths of said end rails of said resting frame being generally parallel to each other, said lengths of said side rails of said resting frame being generally parallel to each other, said lengths of said end rails being generally perpendicular to said lengths of said side rails.

7. The protective pet dish of claim 1, wherein a support leg is positioned adjacent each of said corners of said resting frame.

8. The protective pet dish of claim 1, said lower end of said support leg is coupled to said base of said moat cup.

9. A protective pet dish apparatus, comprising:

a container having a bottom panel and a side wall;

said bottom panel of said container being generally rectangular and having an outer perimeter;

said side wall of said container being upwardly extended around said outer perimeter of said bottom panel of said container;

said side wall of said container having an upper edge, said container having a height defined between said bottom panel of said container and said upper edge of said side wall of said container wherein said height of said container is at least 4 inches;

a resting frame being generally rectangular and having a pair of spaced apart end rails and a pair of spaced apart side rails extending between said end rails of said resting frame;

said resting frame having a plurality of corners, a corner of said resting frame being formed at each intersection between an end rail and a side rail of said resting frame;

each of said rails of said resting frame having a length;

said lengths of said end rails of said resting frame being generally parallel to each other, said lengths of said side rails of said resting frame being generally parallel to each other, said lengths of said end rails being generally perpendicular to said lengths of said side rails;

each of said rails of said resting frame having a generally L-shaped cross section taken generally perpendicular to said length of said rail, each of said rails having a generally horizontal portion and a generally vertical portion upwardly extending from said horizontal portion of said rail;

said bottom panel of said container being rested on said horizontal portions of said rails of said resting frame, said vertical portions of said rails of said resting frame being disposed around said side wall of said container;

said resting frame having a plurality of support legs downwardly depending therefrom, a support leg being positioned adjacent each of said corners of said resting frame;

each of said support legs having upper and lower ends, said upper ends of said support legs being coupled to the horizontal portion of said resting frame;

each of said support legs having a moat cup, each moat cup having a base and spaced apart inner and outer ring walls;

said base of said moat cup being generally circular and having a center and an outer perimeter;

said outer ring wall of said moat cup being generally cylindrical and being upwardly extended around said outer perimeter of said base of said moat cup;

said inner ring wall of said moat cup being generally cylindrical and being upwardly extended from said base of the respective moat cup between said center of said base and said outer perimeter of said base;

said inner ring wall defining a center space, said inner and outer ring walls defining a moat space, said moat space being for holding a fluid therein; and said lower end of each support leg being inserted into said center space of the associated moat cup such that said lower end of said support leg rests on said base of said moat cup, said lower end of said support leg being coupled to said base of said moat cup.

* * * * *